(12) United States Patent
Morikami

(10) Patent No.: US 10,857,720 B2
(45) Date of Patent: Dec. 8, 2020

(54) LIQUID BLOW MOLDING METHOD

(71) Applicant: YOSHINO KOGYOSHO CO., LTD., Tokyo (JP)

(72) Inventor: Shigeki Morikami, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 184 days.

(21) Appl. No.: 16/322,078

(22) PCT Filed: Jun. 7, 2017

(86) PCT No.: PCT/JP2017/021185
§ 371 (c)(1),
(2) Date: Jan. 30, 2019

(87) PCT Pub. No.: WO2018/025494
PCT Pub. Date: Feb. 8, 2018

(65) Prior Publication Data
US 2019/0184623 A1    Jun. 20, 2019

(30) Foreign Application Priority Data
Aug. 3, 2016  (JP) ................. 2016-153161

(51) Int. Cl.
*B29C 49/46*    (2006.01)
*B29C 49/58*    (2006.01)
(Continued)

(52) U.S. Cl.
CPC .............. *B29C 49/46* (2013.01); *B29C 49/12* (2013.01); *B29C 49/58* (2013.01); *B29C 49/783* (2013.01);
(Continued)

(58) Field of Classification Search
CPC . B29C 49/46; B29C 2049/4664; B29C 49/58; B29C 2049/5803; B29C 2049/5858
See application file for complete search history.

(56) References Cited

U.S. PATENT DOCUMENTS

2015/0190960 A1   7/2015  Chauvin et al.
2015/0298828 A1  10/2015  Klatt et al.
(Continued)

FOREIGN PATENT DOCUMENTS

CN    103443610 A    12/2013
CN    104684708 A     6/2015
(Continued)

OTHER PUBLICATIONS

Mar. 6, 2020 Extended Search Report issued in European Patent Application No. 17836601.9.
(Continued)

*Primary Examiner* — Robert B Davis
(74) *Attorney, Agent, or Firm* — Oliff PLC (57) ABSTRACT

A liquid blow molding method comprises: a preliminary pressurization step of operating a pressurization supply source (30) in a state in which a blow nozzle (23) is closed by a seal body (27), to preliminarily pressurize a liquid (L) between the pressurization supply source (30) and the blow nozzle (23); an operating condition setting step of setting an operating condition of the pressurization supply source (30) based on data obtained as a result of the preliminary pressurization step; and a blow molding step of operating the pressurization supply source (30) under the operating condition set in the operating condition setting step in a state in which the blow nozzle (23) is opened, to liquid blow mold a preform (2) into a container of a predetermined shape.

3 Claims, 7 Drawing Sheets (51) Int. Cl.
  *B29C 49/12* (2006.01)
  *B29C 49/78* (2006.01)
  *B29C 49/42* (2006.01)
  *B29L 31/00* (2006.01)

(52) U.S. Cl.
  CPC .......... *B29C 2049/4294* (2013.01); *B29C 2049/4602* (2013.01); *B29C 2049/5858* (2013.01); *B29L 2031/7158* (2013.01)

(56) References Cited

U.S. PATENT DOCUMENTS

| | | | |
|---|---|---|---|
| 2015/0314518 A1 | 11/2015 | Gillet | |
| 2017/0008215 A1* | 1/2017 | Suyama | B29C 49/16 |
| 2017/0008216 A1* | 1/2017 | Suyama | B29C 49/783 |
| 2019/0030780 A1* | 1/2019 | Suyama | B29C 49/12 |
| 2019/0118452 A1* | 4/2019 | Suzuki | B29C 49/4268 |
| 2020/0247030 A1* | 8/2020 | Okuyama | B29C 49/46 |

FOREIGN PATENT DOCUMENTS

| | | |
|---|---|---|
| JP | 2004-093485 A | 3/2004 |
| JP | 2013-208834 A | 10/2013 |
| WO | 2014/049930 A1 | 4/2014 |
| WO | 2015/114705 A1 | 8/2015 |
| WO | 2015/136369 A2 | 9/2015 |
| WO | 2015/197846 A1 | 12/2015 |
| WO | 2016/017153 A1 | 2/2016 |

OTHER PUBLICATIONS

Jul. 11, 2017 International Search Report issued in International Patent Application No. PCT/JP2017/021185.
Jun. 2, 2020 Office Action issued in Chinese Patent Application No. 201780048135.7.

* cited by examiner

FIG. 7

LIQUID BLOW MOLDING METHOD

TECHNICAL FIELD

The present disclosure relates to a liquid blow molding method of supplying a pressurized liquid into a bottomed cylindrical preform from a pressurization supply source through a blow nozzle and molding, from the preform, a liquid-containing container which is a container of a predetermined shape containing a content liquid.

BACKGROUND

Synthetic resin-made containers such as bottles made of polypropylene (PP) and bottles made of polyethylene terephthalate (PET) are used to contain, as content liquids, various liquids such as beverages, cosmetics, medicines, detergents, shampoos, and hair conditioners.

Such a container is typically manufactured by blow molding a bottomed cylindrical preform made of a thermoplastic synthetic resin material such as the above-mentioned materials. As a blow molding method of molding a preform into a container, liquid blow molding using a pressurized liquid instead of pressurized air as a pressurized medium supplied into a preform is known.

For example, JP 2013-208834 A (PTL 1) describes a liquid blow molding method whereby a preform preheated to a temperature at which stretchability is developed is set in a mold for blow molding and, while stretching the preform in the longitudinal direction by a stretching rod, a liquid pressurized to a predetermined pressure is supplied into the preform from a pressurization supply source through a blow nozzle to blow mold the preform into a container of a predetermined shape along the cavity of the mold. With such a liquid blow molding method, the content liquid eventually contained in the container as a product, such as a beverage, can be used as the liquid supplied into the preform to mold, from the preform, a liquid-containing container which is the container of the predetermined shape containing the content liquid. This eliminates the need for a step of filling the molded container with the content liquid, and simplifies the production process and the structure of the production line (device).

CITATION LIST

Patent Literature

PTL 1: JP 2013-208834 A

SUMMARY

Technical Problem

The pressurization supply source for supplying the pressurized liquid into the preform may be a plunger pump. An example of the plunger pump is a plunger pump of position control type that moves a plunger from original position to final position at a predetermined speed to force a predetermined amount of liquid from the cylinder into the preform with a predetermined pressure.

In the case of performing liquid blow molding using the plunger pump of position control type, if air bubbles (air) are mixed in the liquid to be supplied into the preform, the filling pressure or filling amount of the liquid supplied into the preform changes depending on the amount of air bubbles mixed in the liquid. Meanwhile, the amount of air bubbles mixed in the liquid can vary depending on the lot of the bulk packaging the liquid, and can also vary depending on the viscosity of the liquid. Thus, liquid blow molding using the plunger pump of position control type has the problem in that, if the lot or viscosity of the liquid used differs, the formativeness of the container may decrease or the amount of liquid contained in the molded container may vary.

It could therefore be helpful to provide a liquid blow molding method that can reliably mold a preform into a container of a predetermined shape using a liquid and make the amount of the liquid contained in the molded container uniform regardless of the amount of air bubbles mixed in the liquid.

Solution to Problem

A liquid blow molding method according to the present disclosure is a liquid blow molding method of supplying a pressurized liquid into a bottomed cylindrical preform from a pressurization supply source through a blow nozzle and molding, from the preform, a liquid-containing container which is a container of a predetermined shape containing a content liquid, the liquid blow molding method comprising: a preliminary pressurization step of operating the pressurization supply source in a state in which the blow nozzle is closed by a seal body, to preliminarily pressurize a liquid between the pressurization supply source and the blow nozzle; an operating condition setting step of setting an operating condition of the pressurization supply source based on data obtained as a result of the preliminary pressurization step; and a blow molding step of operating the pressurization supply source under the operating condition set in the operating condition setting step in a state in which the blow nozzle is opened, to liquid blow mold the preform into the container of the predetermined shape.

Preferably, in the liquid blow molding method according to the present disclosure, in the blow molding step, a filling pressure of a liquid supplied into the preform is monitored, and the operating condition of the pressurization supply source is corrected based on a difference of the filling pressure from a reference value.

Preferably, in the liquid blow molding method according to the present disclosure, the operating condition of the pressurization supply source is corrected based on a difference of at least one of a pressure increase inclination, a primary peak pressure, a point of increase to a secondary peak pressure, and the secondary peak pressure of the filling pressure of the liquid from a reference value.

Advantageous Effect

It is thus possible to provide a liquid blow molding method that can reliably mold a preform into a container of a predetermined shape using a liquid and make the amount of the liquid contained in the molded container uniform regardless of the amount of air bubbles mixed in the liquid.

DETAILED DESCRIPTION

More detailed description will be given below with reference to drawings.

A liquid blow molding method according to the present disclosure is a liquid blow molding method of supplying a pressurized liquid into a bottomed cylindrical preform from a pressurization supply source through a blow nozzle and molding, from the preform, a liquid-containing container which is a container of a predetermined shape containing a content liquid, the liquid blow molding method comprising: a preliminary pressurization step of operating the pressurization supply source in a state in which the blow nozzle is closed by a seal body, to preliminarily pressurize a liquid between the pressurization supply source and the blow nozzle; an operating condition setting step of setting an operating condition of the pressurization supply source based on data obtained as a result of the preliminary pressurization step; and a blow molding step of operating the pressurization supply source under the operating condition set in the operating condition setting step in a state in which the blow nozzle is opened, to liquid blow mold the preform into the container of the predetermined shape. The liquid blow molding method according to the present disclosure can be regarded as a method of manufacturing, from a preform, a liquid-containing container containing a content liquid. For example, the liquid blow molding method according to the present disclosure can be carried out using a liquid blow molding device 1 illustrated in FIG. 1.

Figure 1:
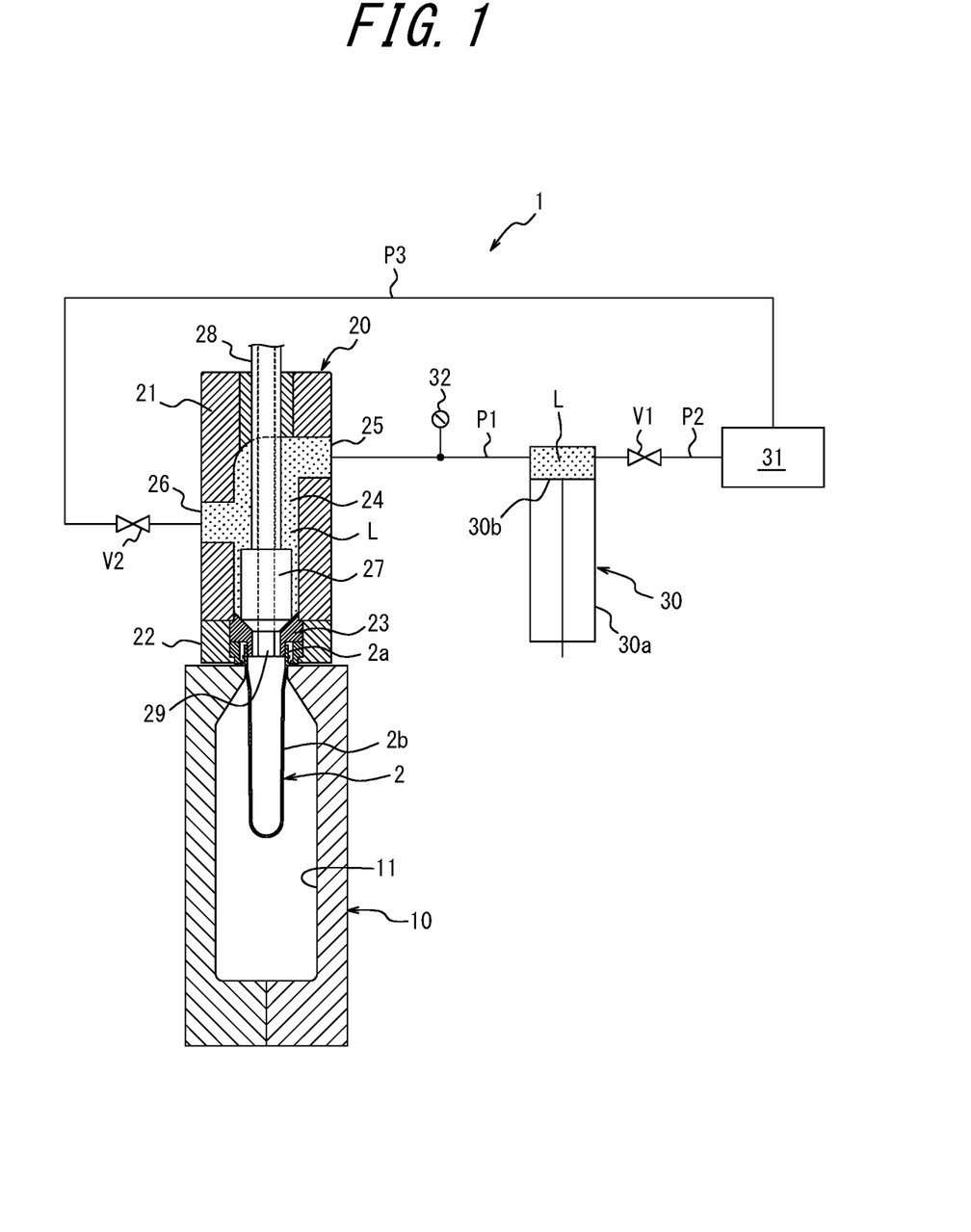
FIG. 1 is an explanatory diagram illustrating an example of a liquid blow molding device used in a liquid blow molding method according to one of the disclosed embodiments.

The liquid blow molding device 1 illustrated in FIG. 1 subjects a preform 2 to liquid blow molding to mold, from the preform 2, a liquid-containing container which is a container of a predetermined shape containing a content liquid.

Herein, the liquid blow molding refers to blow molding using a pressurized liquid L as a pressurized medium (pressurized fluid) supplied into the preform 2, instead of pressurized air used in air blow molding.

The liquid L supplied into the preform 2 (i.e. the content liquid contained in the molded container) may be any of various liquids such as beverages, cosmetics, medicines, detergents, shampoos, and hair conditioners.

The preform 2 is, for example, made of a thermoplastic synthetic resin material such as polypropylene (PP) or polyethylene terephthalate (PET), and shaped like a bottomed cylinder having a cylindrical mouth part 2a forming an open end and a cylindrical barrel part 2b connected to the mouth part 2a and closed at its lower end. The shape of the preform 2 is not limited to such, and may be any of various shapes depending on the shape of the molded container and the like, as long as it is bottomed cylindrical.

Although not specifically illustrated, the outer wall surface of the mouth part 2a has an engaging protrusion for attaching a closure cap (not illustrated) to the mouth part 2a of the molded container by capping (undercut engagement). Instead of the engaging protrusion, the outer wall surface of the mouth part 2a may have an external thread to attach a closure cap to the mouth part 2a by screw connection.

The liquid blow molding device 1 includes a mold 10 for blow molding. The mold 10 has a cavity 11 whose shape corresponds to the final shape of the container such as a bottle shape. The cavity 11 is open upward at the upper surface of the mold 10. The preform 2 is placed in the mold 10 with the barrel part 2b being located inside the cavity 11 of the mold 10 and the mouth part 2a projecting upward from the mold 10.

The mold 10 is openable right and left. By opening the mold 10 right and left after molding the preform 2 into the container, the container can be taken out of the mold 10.

A nozzle unit 20 for supplying the liquid L into the preform 2 is provided above the mold 10. The nozzle unit 20 includes a main block 21 that is movable in the vertical direction relative to the mold 10. A support block 22 is provided at the lower end of the main block 21. The support block 22 supports a blow nozzle 23 attached to the lower end of the main block 21. The blow nozzle 23 is approximately cylindrical, and engages with the mouth part 2a of the preform 2 placed in the mold 10 from above when the main block 21 descends to the lower stroke end.

A supply path 24 extending in the vertical direction is formed inside the main block 21. The supply path 24 is a flow path for supplying the liquid L to the blow nozzle 23, and communicates with the blow nozzle 23 at its lower end. The main block 21 also has a supply port 25 communicating with the upper end of the supply path 24, and a discharge port 26 communicating with the intermediate part of the supply path 24.

A seal body 27 for opening and closing the blow nozzle 23 is provided in the supply path 24. The seal body 27 is located at the lower end of a shaft body 28 that is movable in the vertical direction in the nozzle unit 20, and is movable in the vertical direction in the supply path 24. The seal body 27 is cylindrical. When the seal body 27 moves to closed position which is the lower stroke end position, the lower end surface of the seal body 27 comes into contact with the upper surface of the blow nozzle 23, to close the blow nozzle 23. When the seal body 27 moves upward from the closed position in the nozzle unit 20, the blow nozzle 23 is opened and communicates with the supply path 24. The structure of the seal body 27 may be changed as long as it is capable of opening and closing the blow nozzle 23.

The liquid blow molding device 1 may include a stretching rod 29, as illustrated in the drawing. The stretching rod 29 is inserted in the axial center of the shaft body 28 to be movable in the vertical direction relative to the shaft body 28, and passes through the axial center of the seal body 27 to be retractable from the lower end of the seal body 27. As a result of the stretching rod 29 being driven by a drive source (not illustrated) to move downward, the preform 2 can be stretched in the axial direction. Thus, in the case where the liquid blow molding device 1 includes the stretching rod 29, the liquid blow molding device 1 can perform biaxial stretching blow molding of stretching the preform 2 in the radial direction by the pressurized liquid L supplied from the mouth part 2a while stretching the preform 2 in the axial direction by the stretching rod 29. The stretching rod 29 may be omitted from the liquid blow molding device 1.

The supply port 25 is connected to a plunger pump 30 as a pressurization supply source, through a connection path P1. The plunger pump 30 includes a cylinder 30a, and a plunger 30b movable in the axial direction in the cylinder 30a. Although not specifically illustrated, the plunger 30b is driven by a drive source such as a servomotor to be movable in the cylinder 30a along the axis of the cylinder 30a. The operation of the plunger pump 30, i.e. the plunger 30b, is controlled according to position control whereby the plunger 30b is moved from original position toward final position at a predetermined speed.

The plunger pump 30 is connected to a supply tank 31. The supply tank 31 can contain the liquid L, and heat the liquid L to a predetermined temperature and hold it at the temperature. An on-off valve V1 is provided in a connection path P2 connecting the plunger pump 30 and the supply tank 31. The connection path P2 can be opened and closed with the on-off valve V1.

A pressure gauge 32 is provided in the connection path P1. The pressure gauge 32 can measure the filling pressure of the liquid L supplied from the plunger pump 30 to the preform 2 in the liquid blow molding.

The discharge port 26 is connected to the supply tank 31 through a connection path P3. Thus, the supply path 24 can communicate with the supply tank 31 through the discharge port 26 and the connection path P3. An on-off valve V2 is provided in the connection path P3. The connection path P3 can be opened and closed with the on-off valve V2.

The plunger pump 30 can supply the liquid L pressurized to a predetermined pressure into the preform 2 through the connection path P1, the supply port 25, the supply path 24, and the blow nozzle 23, by operating in the positive direction (pressurization direction) in a state in which the blow nozzle 23 is opened and the on-off valves V1 and V2 are closed. Moreover, the plunger pump 30 can suck the liquid L contained in the supply tank 31 into the cylinder 30a to replenish the plunger pump 30 with the liquid L, by operating in the reverse direction (suction direction) in a state in which the blow nozzle 23 is closed by the seal body 27, the on-off valve V2 is closed, and the on-off valve V1 is opened. Further, the plunger pump 30 can preliminarily pressurize the liquid L between the blow nozzle 23 and the plunger pump 30, by operating in the positive direction in a state in which the blow nozzle 23 is closed by the seal body 27 and the on-off valves V1 and V2 are both closed.

The operations of the nozzle unit 20, the seal body 27, the stretching rod 29, the plunger pump 30, the on-off valve V1, the on-off valve V2, etc. are controlled by a control device (not illustrated) in an integrated manner. This control can be performed with reference to the measurement of the pressure gauge 32. The on-off valves V1 and V2 are preferably electromagnetic valves controllable by the control device.

A method of molding, from the bottomed cylindrical preform 2, the liquid-containing container C which is a container of a predetermined shape containing a content liquid (liquid blow molding method according to the present disclosure) using the liquid blow molding device 1 having such a structure will be described below.

First, the preform 2 preheated to such a predetermined temperature (e.g. 80° C. to 150° C.) at which stretchability is developed using a heating means such as a heater (not illustrated) is placed in the mold 10 for blow molding, and the mold is clamped.

After placing the preform 2 in the mold 10, the nozzle unit 20 is descended toward the mold 10, and the blow nozzle 23 connected to the plunger pump 30 through the supply path 24 is engaged with the mouth part 2a of the preform 2. FIG. 1 illustrates a state in which the blow nozzle 23 is engaged with the mouth part 2a of the preform 2. In a state in which the blow nozzle 23 is engaged with the mouth part 2a of the preform 2, the seal body 27, the on-off valve V1, and the on-off valve V2 are all closed, and the stretching rod 29 is held at original position at which the stretching rod 29 does not project downward from the blow nozzle 23.

Figure 2:
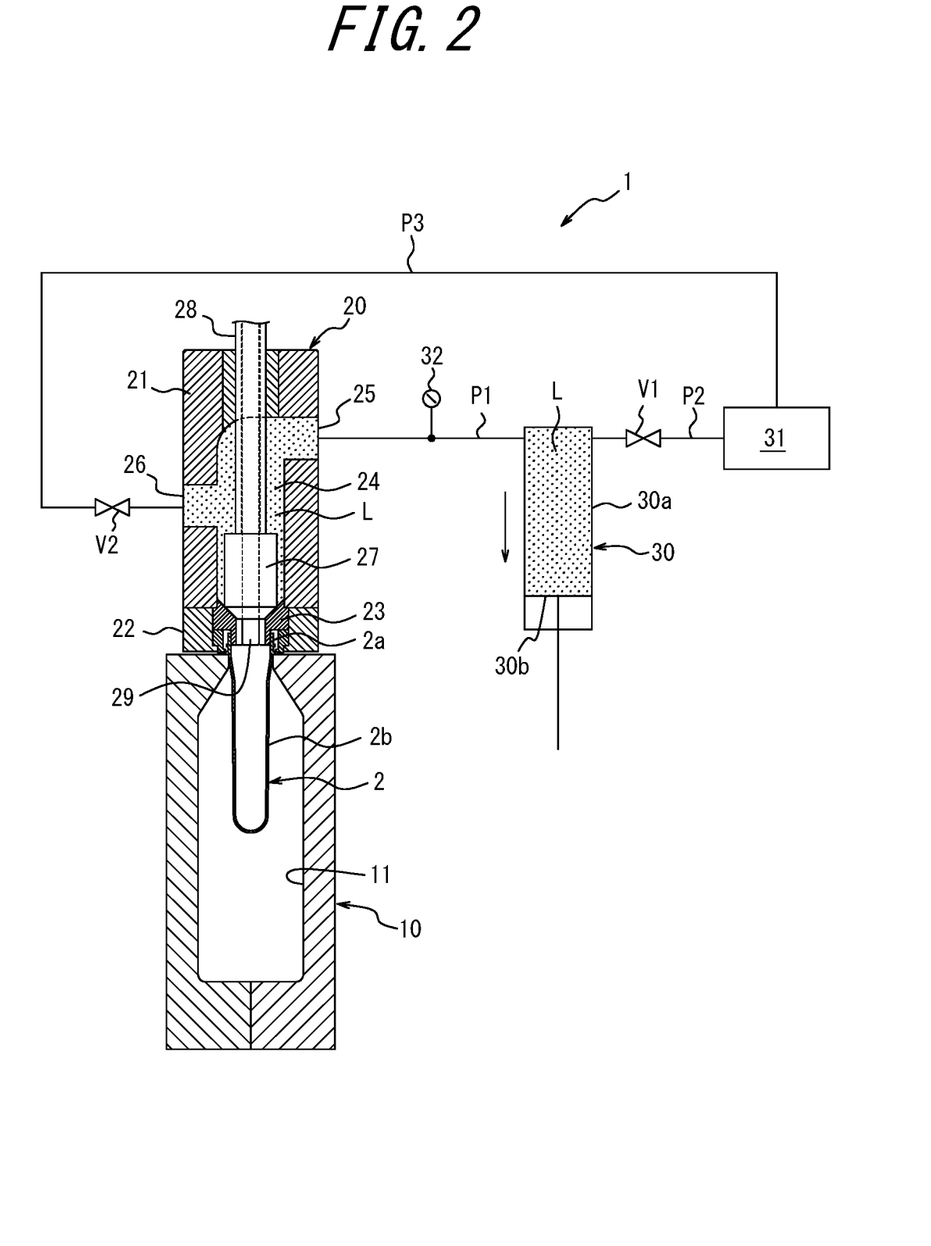
FIG. 2 is an explanatory diagram illustrating the liquid blow molding device in a state in which a plunger pump has been replenished with a liquid.

Next, the on-off valve V1 is opened while the seal body 27 and the on-off valve V2 remain closed, and, in this state, the plunger pump 30 is operated in the reverse direction (suction direction) to suck the liquid L contained in the supply tank 31 into the cylinder 30a of the plunger pump 30, as illustrated in FIG. 2. The amount of the liquid L sucked by the plunger pump 30 is set as appropriate depending on the capacity of the molded liquid-containing container C.

Figure 3:
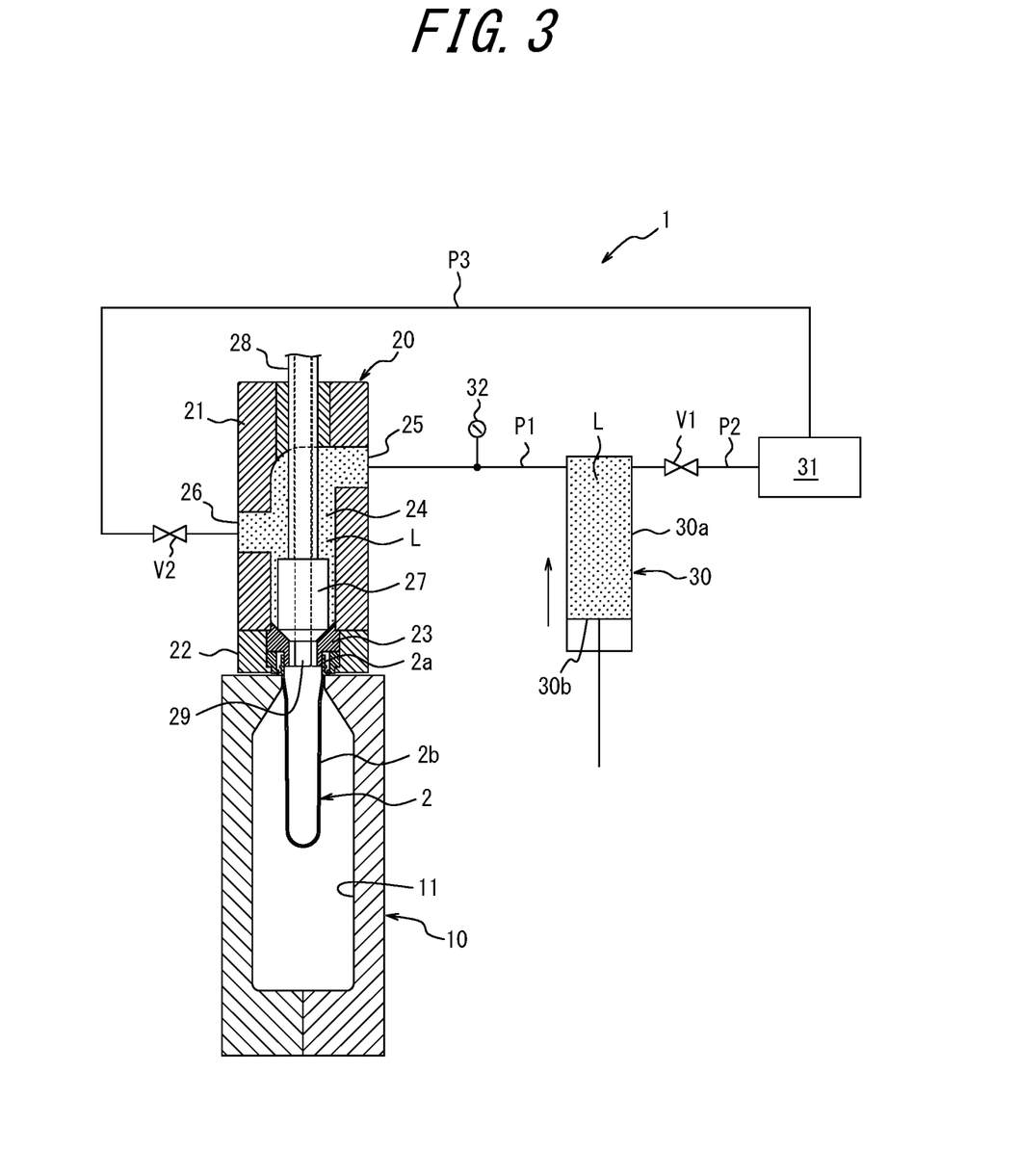
FIG. 3 is an explanatory diagram illustrating the liquid blow molding device in a state in which a preliminary pressurization step is performed.

After a predetermined amount of the liquid L is sucked into the cylinder 30a of the plunger pump 30, a preliminary pressurization step is performed. In the preliminary pressurization step, the seal body 27 and the on-off valves V1 and V2 are all closed, and, in this state, the plunger pump 30 is operated in the positive direction (pressurization direction) to preliminarily pressurize the liquid L between the plunger pump 30 and the blow nozzle 23, i.e. the liquid L in the supply path 24, the supply port 25, and the connection path P1, as illustrated in FIG. 3.

In the preliminary pressurization step, in the case where no air bubbles are mixed in the liquid L between the plunger pump 30 and the blow nozzle 23, the plunger 30b cannot move. In the case where air bubbles are mixed in the liquid L, on the other hand, the plunger 30b moves by the extent to which the air bubbles are compressed, and the pressure of the liquid L detected by the pressure gauge 32 decreases relative to a prescribed pressure. Hence, the amount of air bubbles mixed in the liquid L between the plunger pump 30 and the blow nozzle 23 can be estimated from data such as the moving amount of the plunger 30b and the pressure change of the liquid L obtained as a result of the preliminary pressurization step.

After the preliminary pressurization step ends, an operating condition setting step is performed. In the operating condition setting step, the operating conditions of the plunger pump 30 are set based on the data obtained as a result of the preliminary pressurization step. For example, the operating conditions of the plunger pump 30 may be set to change the endpoint position of the plunger 30b controlled according to position control to be farther from the original position so that the amount of the liquid L supplied into the preform 2 will be uniform, based on the amount of air bubbles mixed in the liquid L estimated from the data obtained as a result of the preliminary pressurization step.

The operating conditions of the plunger pump 30 may also be set to change the moving speed of the plunger 30b depending on the amount of air bubbles mixed in the liquid L, in addition to the above-mentioned change of the endpoint position of the plunger 30b.

Figure 4:
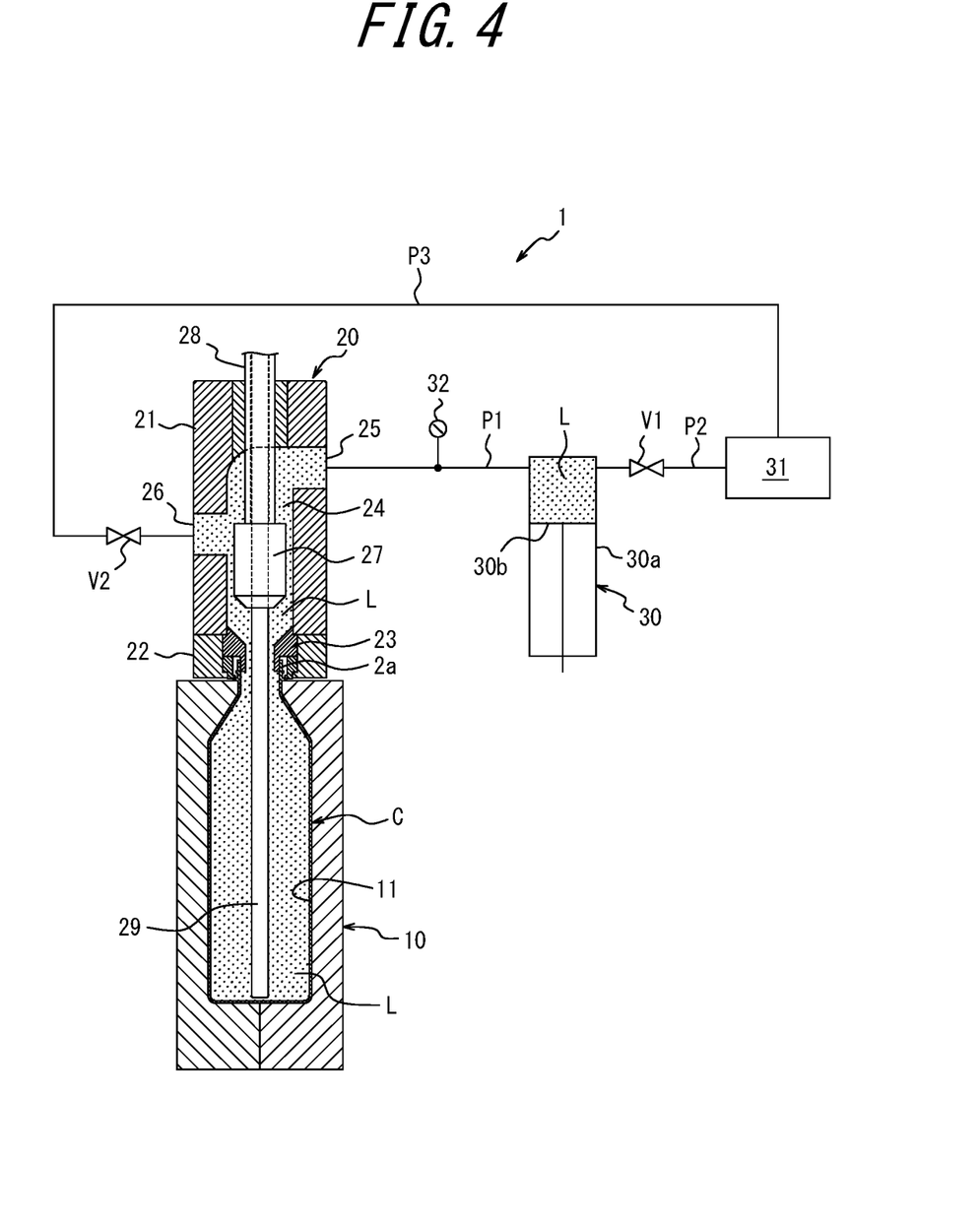
FIG. 4 is an explanatory diagram illustrating the liquid blow molding device in a state in which a preform has been molded into a container as a result of a blow molding step.

After the operating condition setting step ends, a blow molding step is performed. In the blow molding step, in a state in which the blow nozzle 23 is opened and the on-off valves V1 and V2 are closed, the plunger pump 30 is operated in the positive direction under the operating conditions set in the operating condition setting step. As a result, the liquid L pressurized to a predetermined pressure is supplied into the preform 2 from the plunger pump 30 through the blow nozzle 23, thus molding (liquid blow molding) the preform 2 into a container of a predetermined shape. In the blow molding step, the preform 2 is molded into the liquid-containing container C of the predetermined shape along the cavity 11, as illustrated in FIG. 4. After the preform 2 is molded into the liquid-containing container C illustrated in FIG. 4, the blow molding step ends.

Since the operating conditions of the plunger pump 30 in the blow molding step have the endpoint position of the plunger 30b finely adjusted depending on the amount of air bubbles mixed in the liquid L in the operating condition setting step, the filling amount of the liquid L supplied into the preform 2 in the blow molding step can be made uniform regardless of the amount of air bubbles mixed in the liquid L. Moreover, in the case where the moving speed of the plunger 30b is finely adjusted depending on the amount of air bubbles mixed in the liquid L in the operating condition setting step, the filling pressure of the liquid L into the preform 2 in the blow molding step can be made uniform regardless of the amount of air bubbles mixed in the liquid L.

With the liquid blow molding method according to the present disclosure, before each liquid blow molding, the liquid L between the plunger pump 30 and the blow nozzle 23 is preliminarily pressurized to estimate the amount of air bubbles mixed in the liquid L and the operating conditions of the plunger pump 30 are finely adjusted based on the estimated amount of air bubbles mixed in the liquid L. Therefore, even in the case where the amount of air bubbles contained in the liquid L supplied from the supply tank 31 to the plunger pump 30 is not uniform but varies, the preform 2 can be reliably molded into the container of the predetermined shape using the liquid L and the amount of the liquid L contained in the molded container can be made uniform regardless of the amount of air bubbles mixed in the liquid L.

In addition, with the liquid blow molding method according to the present disclosure, even in the case where liquids L of various viscosities different in the exhaustion of air bubbles are used, for each liquid blow molding, the plunger pump 30 can be operated under the operating conditions corresponding to the amount of air bubbles contained in the liquid L to make the filling amount of the liquid L supplied into the preform 2 uniform.

In the case where the liquid blow molding device 1 includes the stretching rod 29, by moving the stretching rod 29 downward in the blow molding step, the preform 2 can be stretched in the axial direction (longitudinal direction) by the stretching rod 29. This enables biaxial stretching blow molding whereby the preform 2 is molded in two axial directions by the pressure of the liquid L and the stretching rod 29. Through biaxial stretching blow molding, the preform 2 can be molded into the liquid-containing container C of the predetermined shape more accurately.

Figure 5:
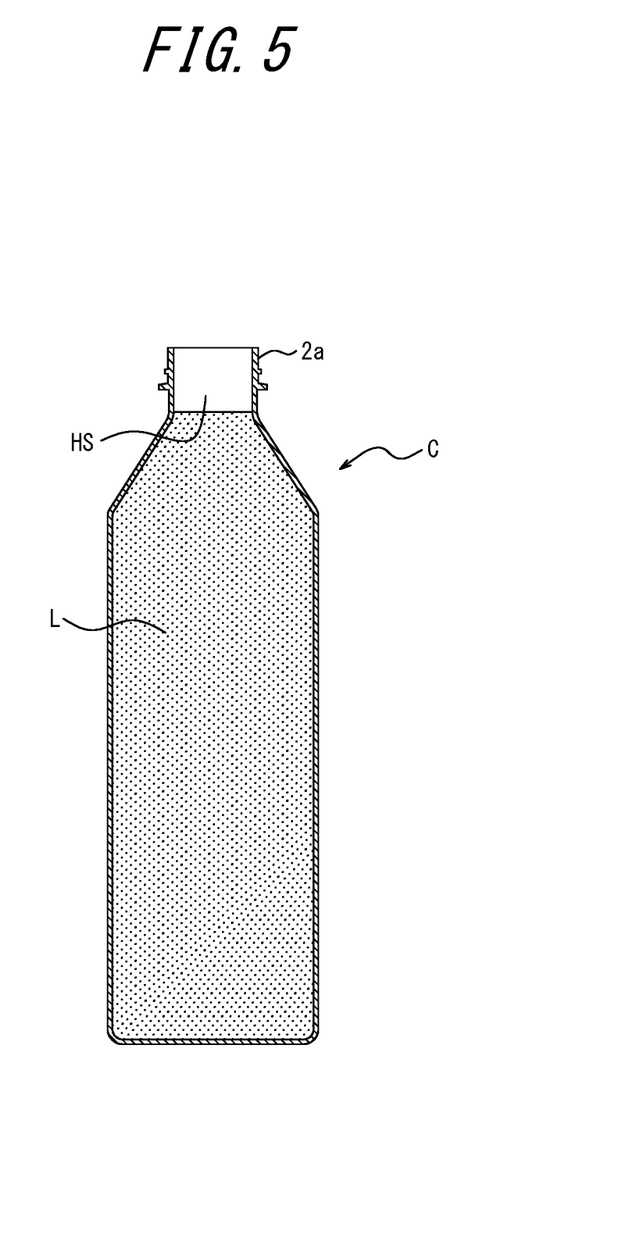
FIG. 5 is a sectional diagram of a liquid-containing container molded by the liquid blow molding method according to one of the disclosed embodiments.

After the blow molding step ends, the blow nozzle 23 is closed by the seal body 27, and the operation of the plunger pump 30 is stopped. The nozzle unit 20 is then moved upward to separate the blow nozzle 23 from the mouth part 2a of the liquid-containing container C, and the mold 10 is opened to take the liquid-containing container C out of the mold 10. FIG. 5 illustrates the liquid-containing container C taken out of the mold 10.

In the case where the liquid blow molding device 1 includes the stretching rod 29, by pulling the stretching rod 29 out of the molded liquid-containing container C, the content amount of the liquid-containing container C can be reduced by the volume of the stretching rod 29 to create a headspace HS in which the liquid is not contained in the liquid-containing container C. In the case where the liquid blow molding device 1 does not include the stretching rod 29 or in the case where the headspace HS created by pulling the stretching rod 29 out is insufficient, the headspace HS may be created by performing a suck back step of, after the liquid blow molding, operating the plunger pump 30 in the reverse direction (suction direction) by a predetermined amount to suck the liquid L from the inside of the molded liquid-containing container C.

In the liquid blow molding method according to the present disclosure, in the blow molding step, the filling pressure of the liquid L supplied into the preform 2 may be monitored to correct the operating conditions of the plunger pump 30 based on the difference of the filling pressure from a reference value. In this case, the operating conditions of the plunger pump 30 may be corrected based on the difference of at least one of the pressure increase inclination, the primary peak pressure, the point of increase to the secondary peak pressure, and the secondary peak pressure of the filling pressure of the liquid L supplied into the preform 2 from a reference value.

Figure 6:
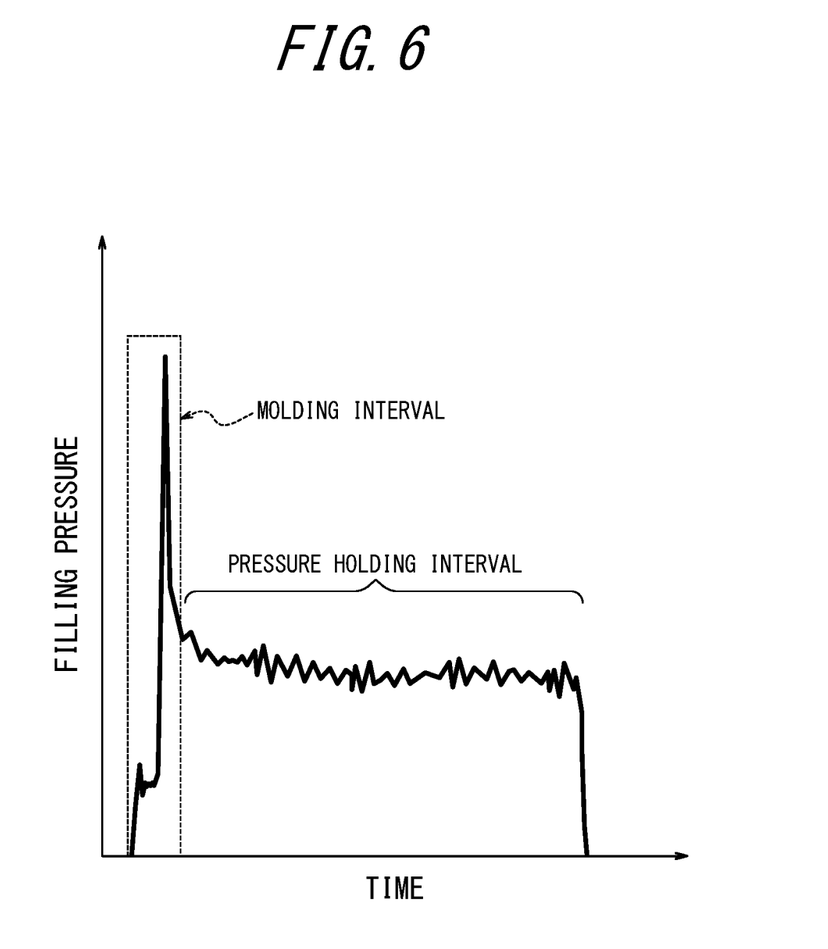
FIG. 6 is a characteristic line diagram illustrating the relationship between the filling pressure and the time in the blow molding step.
Figure 7:
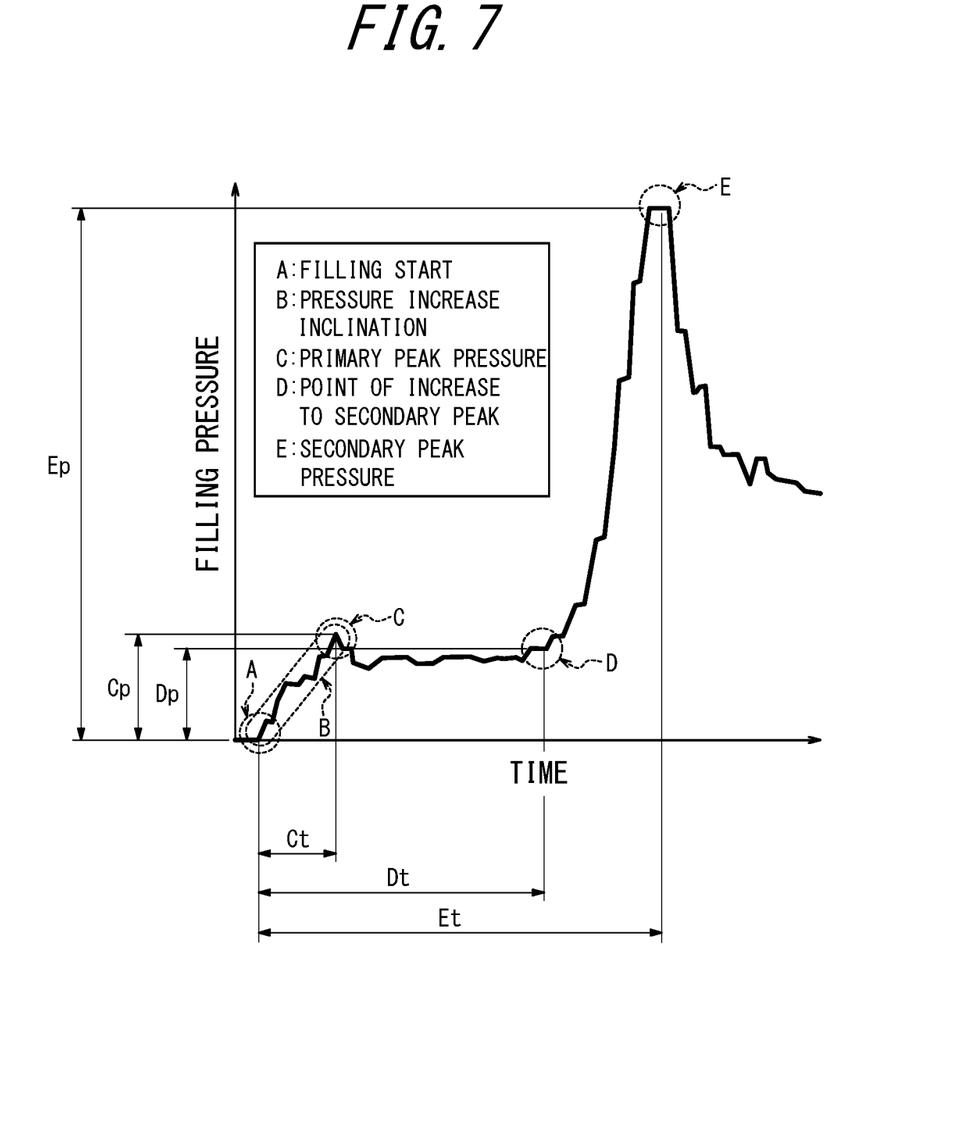
FIG. 7 is a characteristic line diagram illustrating a molding interval in FIG. 6 in an enlarged view.

As illustrated in FIG. 6, the filling pressure of the liquid L supplied into the preform 2 by operating the plunger pump 30 in the blow molding step is set to change according to a process chart having a molding interval in which the preform 2 is molded into the shape along the cavity 11 and a subsequent holding interval in which the inside of the molded container is held at a predetermined pressure. As illustrated in FIG. 7, in the molding interval in the process chart, the filling of the preform 2 with the liquid L starts at A point, and the filling pressure increases from A point at predetermined pressure increase inclination B, and reaches primary peak pressure Cp at C point after Ct seconds from A point. After reaching primary peak pressure Cp, the filling pressure is approximately constant, and reaches Dp at D point after Dt seconds from A point. The increase of the filling pressure to the secondary peak then starts, and the filling pressure reaches secondary peak pressure Ep at E point after Et seconds from A point.

For each of pressure increase inclination B, primary peak pressure Cp at C point, D point as the point of increase to the secondary peak, and secondary peak pressure Ep at E point in the process chart described above, a reference value is set beforehand through experiments or the like. These reference values are used as the reference to accurately mold the preform 2 into the container of the predetermined shape by liquid blow molding and set the amount of the liquid L contained in the molded container to a prescribed amount.

In the blow molding step, pressure increase inclination B, primary peak pressure Cp at C point, D point as the point of increase to the secondary peak, and secondary peak pressure Ep at E point of the filling pressure of the liquid L supplied into the preform 2 are monitored and, when any of the values is different from the corresponding reference value, the operating conditions of the plunger pump 30 are corrected according to feedback control to eliminate the difference. In this way, the filling process of the liquid L in the blow molding step can be optimized to mold the preform 2 into the container of the predetermined shape further accurately.

The operating conditions of the plunger pump 30 may be corrected based on at least one of pressure increase inclination B, primary peak pressure Cp at C point, D point as the point of increase to the secondary peak, and secondary peak pressure Ep at E point of the filling pressure of the liquid L supplied into the preform 2. The operating conditions of the plunger pump 30 may be corrected based on any two or more or all of pressure increase inclination B, primary peak pressure Cp at C point, D point as the point of increase to the secondary peak, and secondary peak pressure Ep at E point of the filling pressure of the liquid L. The operating conditions of the plunger pump 30 may be corrected based on other points or portions of the filling pressure of the liquid L supplied into the preform 2 in the process chart. For example, the operating conditions of the plunger pump 30 may be corrected based on the filling pressure of the liquid L in the pressure holding interval in FIG. 6.

The present disclosure is not limited to the foregoing embodiment, and various changes can be made without departing from the scope of the present disclosure.

For example, although the foregoing embodiment describes the case where the liquid blow molding method according to the present disclosure is carried out using the liquid blow molding device 1 of the structure illustrated in FIG. 1, the liquid blow molding method according to the present disclosure may be carried out using a liquid blow molding device of another structure.

Although the foregoing embodiment describes the case where the plunger pump 30 is used as the pressurization supply source, the pressurization supply source is not limited to the plunger pump 30 as long as it is capable of pressurizing the liquid L and supplying the liquid L into the preform 2.

REFERENCE SIGNS LIST

1 liquid blow molding device
2 preform
2*a* mouth part
2*b* barrel part
10 mold
11 cavity
20 nozzle unit
21 main block
22 support block
23 blow nozzle
24 supply path
25 supply port
26 discharge port
27 seal body
28 shaft body
29 stretching rod
30 plunger pump (pressurization supply source)
30*a* cylinder
30*b* plunger
31 supply tank
32 pressure gauge
L liquid (content liquid)
P1 connection path
V1 on-off valve
P2 connection path
P3 connection path
V2 on-off valve
C liquid-containing container
HS headspace

The invention claimed is:

1. A liquid blow molding method of supplying a pressurized liquid into a bottomed cylindrical preform from a pressurization supply source through a blow nozzle and molding, from the preform, a liquid-containing container which is a container of a predetermined shape containing a content liquid, the liquid blow molding method comprising:
   a preliminary pressurization step of operating the pressurization supply source in a state in which the blow nozzle is closed by a seal body, to preliminarily pressurize a liquid between the pressurization supply source and the blow nozzle;
   an operating condition setting step of setting an operating condition of the pressurization supply source based on data obtained as a result of the preliminary pressurization step; and
   a blow molding step of operating the pressurization supply source under the operating condition set in the operating condition setting step in a state in which the blow nozzle is opened, to liquid blow mold the preform into the container of the predetermined shape.

2. The liquid blow molding method according to claim 1, wherein in the blow molding step, a filling pressure of a liquid supplied into the preform is monitored, and the operating condition of the pressurization supply source is corrected based on a difference of the filling pressure from a reference value.

3. The liquid blow molding method according to claim 2, wherein the operating condition of the pressurization supply source is corrected based on a difference of at least one of a pressure increase inclination, a primary peak pressure, a point of increase to a secondary peak pressure, and the secondary peak pressure of the filling pressure of the liquid from a reference value.

* * * * *